United States Patent [19]

Röhm

[11] 4,243,237
[45] Jan. 6, 1981

[54] FORCE-COMPENSATED SPLIT-JAW LATHE CHUCK

[76] Inventor: Günter H. Röhm, Heinrich-Röhm-Strasse 50, 7927 Sontheim, Fed. Rep. of Germany

[21] Appl. No.: 40,128

[22] Filed: May 18, 1979

[30] Foreign Application Priority Data

Aug. 18, 1978 [DE] Fed. Rep. of Germany ....... 2836191
Oct. 17, 1978 [DE] Fed. Rep. of Germany ....... 2845133

[51] Int. Cl.³ ............................................. B23B 31/14
[52] U.S. Cl. ..................................... 279/121; 279/110
[58] Field of Search ............... 279/110, 121, 123, 1 R, 279/111, 113, 112, 1 C

[56] References Cited

U.S. PATENT DOCUMENTS 3,682,491 8/1972 Sakazaki ..................... 279/110 X

Primary Examiner—William R. Briggs
Attorney, Agent, or Firm—Karl F. Ross

[57] ABSTRACT

A lathe chuck has a chuck body rotatable about a chuck axis and formed with a plurality of angularly spaced and radially extending inner guides receiving respective inner jaw parts and with a plurality of angularly spaced and radially extending outer guides receiving respective outer jaw parts. An operating element is engageable with the inner jaw parts for radially displacing same in the chuck body in the respective inner guides. Coupling members are axially displaceable in the inner jaw parts and are each displaceable between a coupling position engaging the respective outer jaw part and coupling same to the respective inner jaw parts for joint radial movement and a decoupling position for relative radial diaplacement of the respective jaw parts. Radially displaceable cams in each of the inner jaw parts engage the respective coupling members and are biased by respective springs into radial outer positions in which the respective coupling members are in the coupling position. When depressed radially inwardly against these springs the cams allow the respective coupling members to move into the decoupling positions. A release ring rotatable on the chuck body has surfaces that can displace all of these cams radially inwardly jointly or sequentially.

10 Claims, 3 Drawing Figures

FORCE-COMPENSATED SPLIT-JAW LATHE CHUCK

FIELD OF THE INVENTION

The present invention relates to a lathe chuck. More particularly this invention concerns a force-compensated split-jaw lathe chuck.

BACKGROUND OF THE INVENTION

A standard split-jaw lathe chuck has a chuck body rotatable bout a chuck axis and formed with a plurality of angularly spaced and radially extending inner guides receiving respective inner jaws parts, and with a plurality of angularly spaced and radially extending outer guides receiving respective outer jaw parts projecting axially from the chuck body. Respective coupling members are axially displaceable in the inner jaw parts between axially advanced coupling positions radially linking the respective jaw parts and axially retracted decoupling position permitting relative radial displacement of the respective jaw parts. These coupling members may be jointly displaceable as described in U.S. Pat. No. 3,682,491, or independently displaceable as described in my earlier copending application Ser. No. 886,348 filed Mar. 14, 1978.

The advantage of such a structure is that it allows the outer jaw parts to be roughly adjusted for the workpiece to be clamped, so that only a modest radial stroke is necessary for the jaws to clamp such a workpiece. As a result a large mechanical advantage can be used so that the operating member moves through a relatively long axial stroke to produce a relatively short radial stroke of the jaws. Hence a good mechanical advantage is obtained for extremely tight gripping of a workpiece. What is more exchanging of the jaws, or using jaw blanks such as described in my jointly filed and copending application is also possible.

One of the recurring problems with such a chuck is that when spun during a machining operation the radially outwardly effective centrifugal forces on the jaws loosen the hold of the chuck on the workpiece. Thus it is known to provide force compensation such as described in my copending and jointly filed application. In such an arrangement radially displaceable weights on the chuck body are engaged via force-converting members with the inner jaw parts so that radially outwardly effective forces in these weights are converted into radially inwardly effective forces applied to the inner jaw parts. In this manner centrifugal forces can be balanced in the chuck.

These centrifugal forces are advantageously employed in split-jaw lathe chucks of the type described in my above-cited copending application Ser. No. 886,348 wherein radially displaceable cams are provided in each of the inner jaw parts engaging the respective coupling member. These cams are radially displaceable between outer positions urging the coupling members forwardly into the coupling positions and radial inner positions allowing the coupling members to move axially backwardly. Thus in such a system the radially outwardly effective forces on these cams ensure that as rotation speed increases the forces pressing the coupling members into engagement with the respective outer jaw parts also increase.

A considerable disadvantage of this last-described type of chuck is that it is necessary to act on the cams directly at each of the jaws to separate the respective inner and outer jaw parts. This means that it is frequently necessary for the lathe operator to rotate the chuck while setting the jaws so as to have access to the various cams. Obviously in some machining situations this is extremely difficult, as the workpiece being mounted in the chuck must similarly be rotated.

OBJECTS OF THE INVENTION

It is therefore an object of the present invention to provide an improved split-jaw lathe chuck.

Another object is to provide an improved force-compensation system for such a split-jaw lathe chuck.

A further object is to provide a chuck wherein the cams for the individual jaws can be operated even from the opposite side of the chuck if necessary.

A yet further object is to provide such a system wherein the normally protruding cams are proteacted against accidental actuation from releasing the respective outer jaw parts.

SUMMARY OF THE INVENTION

These objects are attained according to the instant invention in a chuck of the above-described general type, having inner and outer jaw parts radially displaceable in respective inner and outer guides and couplable by means of respective coupling members axially displaceable in the inner jaw parts. Respective radially displaceable cams are provided which engage the coupling members and are displaceable between radially outer positions and radial inner positions in which the respective coupling members can assume decoupling position. Springs are braced against these cams and urge them radially outwardly into the outer position. Finally according to this invention a release ring rotatable on the chuck about the axis is formed with at least one radially inwardly extending projection engageable with the cams to move same into the inner positions against the forces of the respective springs. Otherwise these cams are received within inwardly open recesses of the rings and are completely covered thereby.

Thus with the system according to the instant invention rotation of this release ring decouples any of the inner and outer jaw parts.

According to further featurs of this invention the release ring can be provided with formations having the same angular spacing as the cams, so that the release ring can simultaneously displace all of the cams radially inwardly at the same time for movement of the respective coupling members into the decoupling positions, and vice versa. Thus an operator having access to any portion of the ring can decouple all the outer jaw parts.

In accordance with another feature of this invention the formations on the release ring are not spaced in the same manner as the cams. Instead these formations are spaced in such a manner that during rotation of the ring about the chuck axis in a predetermined direction the cams will be actuated sequentially, one at a time. In this manner the operator can rotate the release ring in a predetermined direction so as to release the outer jaw parts one at the time for sequential adjustment or replacement of same. This type of arrangement prevents the common accident of the lowermost outer jaw part falling out of the chuck when released. According to this invention each of the formations is constituted as a bump spaced from the formation on one side by a distance equal to more than the angular distance between adjacent cams and spaced from the bump on the other side by a distance equal to less than the average spacing between the adjacent cams. Thus in a three-jaw chuck the spacing between one of the projections and the projection to one side of it will be 120° plus the angular dimension of the projection and the spacing between it and the projection to the other side will be 120° minus the angular dimension of the projection. Of course in a four-jaw chuck the basic spacing increment will be 90°, and so on.

According to further features of this invention the chuck body is provided with a plurality of radially displaceable weights engaging via respective force-converting levers on the inner jaw parts. Thus radially outwardly effective centrifugal forces of the weights will be radially inwardly effective on the inner jaw parts to counteract the normally inherent centrifugally caused loosening of the chuck.

It is also possible in accordance with this invention to form the chuck body at each of the inner jaw parts with an axially forwardly open recess in which respective coupling members can engage in a radial outermost position of the respective jaw. Otherwise the chuck body is formed with a blocking surface that prevents axial backward displacement of the coupling members, so that these coupling members can only be moved into the decoupling positions in the outermost positions of the respective jaws. This not only prevents decoupling of the jaw parts when they are clamped on the workpiece, but also prevents closing of the clutch when any of the coupling members is in the decoupling position. A lathe normally has a switch which prevents its motor from being started up when the operating member for the power chuck is in an axial position corresponding to the radial outermost position of the jaws, so that this arrangement will prevent starting-up of the lathe when any of the jaws is decoupled.

SPECIFIC DESCRIPTION

Figure 1:
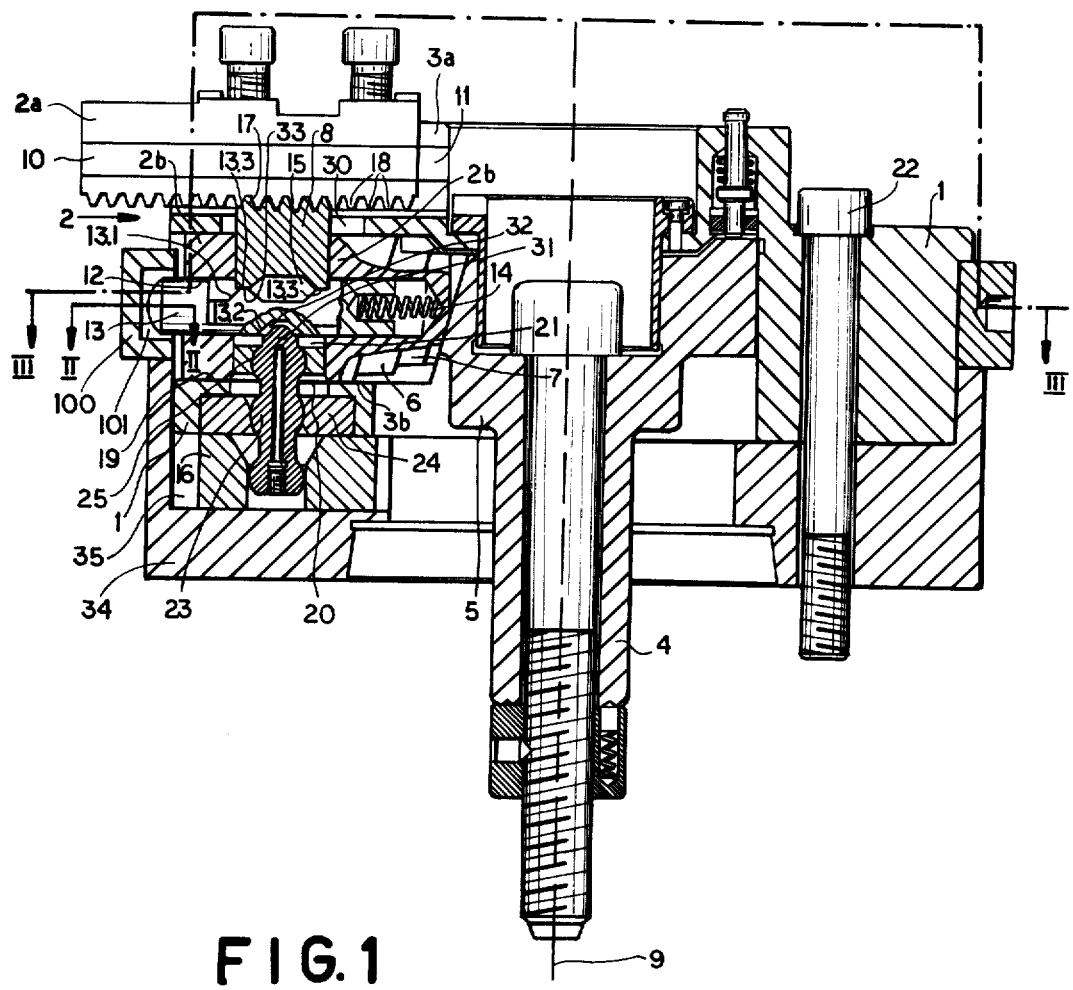
FIG. 1 is an axial section through a chuck according to this invention.

A chuck according to the instant invention has a chuck body 1 centered on a chuck axis 9 and having a rear plate 34 securable to the headstock of a lathe by means of machine screws 22. This chuck has three jaws generally indicated at 2 and each radially displaceable in a guide generally indicated at 3. More particularly each jaw 2 has an outer jaw part 2a radially displaceable in an outer guide 3a by means of radially extending and interfitting rectangular-section grooves 10 and ridges 11, and an inner jaw part 2b radially reciprocal in an inner guide 3b communicating through a respective axially extending window 30 with the respective outer guide 3a. According to this invention each inner jaw part 2b can be radially linked to the respective outer jaw part 2a by means of an axially slidable coupling member 8 having a front face formed with teeth 17 meshable with teeth 18 formed on the back face of the respective outer jaw part 2a. These outer jaw parts 2a may be fitted with jaw blanks of conventional type, or of the type described in my copending and jointly filed application.

An operator 4 provided with an operating sleeve 5 formed with so-called wedge hooks 6 engages wedge-hooks 7 formed on the inner jaw parts 2b. In this manner axial advance upwardly as seen in FIG. 1 will displace the jaws 2 radially outwardly and opposite displacement downwardly as seen in FIG. 1 will dispplace the jaws 2 radially inwardly. In FIG. 1 the sole jaw visible is in the radial outermost position.

Each of the inner jaw parts 2b is formed with a radially outwardly open blind bore 12 receiving the respective cam pin 13, with a compression spring 14 being braced against the radial inner end of each cam pin 13 and the blind end of the respective bore 12. Furthermore each of the coupling members 8 is formed with a radially throughgoing passage 15 through which the respective cam pin 13 also passes.

Each of the coupling members 8 is axially slidable between the illustrated coupling position with its teeth 17 meshing with the teeth 18 of the respective outer jaw part 2a to radially couple the respective jaw parts 2a and 2b together, and an axially backwardly withdrawn position with the teeth 17 and 18 out of mesh with each other and the outer jaw part 2a freely movable radially relative to the respective inner jaw part 2b. This axial backward displacement is effected by the cam pin 13 in a manner described below, and can only take place in the radial outermost position of the respective inner jaw part 2b, as only in this position are recesses 21 formed in a surface 20 of the chuck body 1 axially aligned behind the rear end of the coupling members 8. Thus when not in this radial outermost position it is impossible to displace the coupling member 8 of any of the jaws 2 axially backwardly to decouple the respective front or outer jaw part 2a.

Each of the cam pins 13 has an axially forwardly directed side formed with inclined surfaces 13.1 flanking flat surfaces 13.3 lying in a plane perpendicular to the axis 9. The rear face of each of the coupling members 8 has a flat surface 33 that can stand flatly on the surfaces 13.3 to hold the respective coupling member 8 in the axially advanced coupling position as illustrated. When the surfaces 13.3 and 33 are aligned axially, therefore, the respective coupling member 8 will be positively held in its coupling position. Radial inward displacement of the respective cam pin 13 will allow the coupling member 8 to move radially backwardly, so long as it is aligned with the recess 21, to decouple the respective inner and outer jaw parts 2a and 2b.

In order to compensate for centrifugal forces which normally urge the jaws 2 outwardly, the chuck according to this invention is provided axially behind each of the jaws 2 with a weight 16 slidable in a radially extending guide 35. Each weight 16 engages one end of a force-transmitting and -converting lever 23 flucrumed in a ring 24 of the chuck body 1 and having an opposite end 25 received in the respective inner jaw part 2b. Thus this lever 23 is of the first-class type and converts radially outwardly effective forces in the respective weight 16 into radially inwardly effective forces in the respective inner jaw part 2b. In addition this lever 23 has a tip 31 received with clearance in a backwardly axially flared recess 32 having inclined side flanks 13.2. Each lever 23 is limitedly axially displaceable and is formed with rounded regions at each of its ends and at its fulcrum. Radially inward displacement of the respective locking cam pin 13 will bring the respective inclined surface 13.2 to bear on the tip 31 to displace it axially backwardly.

Figure 2:
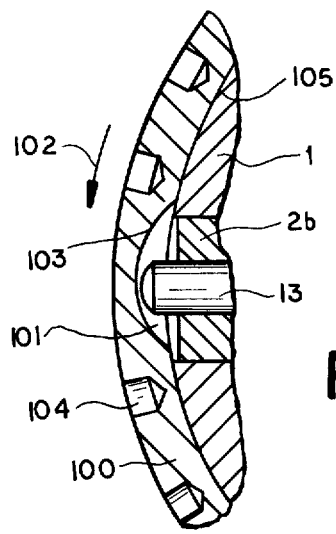
FIG. 2 is a section taken along line II—II of FIG. 1.

As seen in FIGS. 1 and 2 an adjusting ring 100 centered on the axis 9 and held between the backplate 34 and the chuck body 1 is rotatable about the chuck body 1 at the level of the cam pins 13. This ring 100 is formed with three angularly equispaced recesses 101 having inclined sides 103. When the pins 13 are engaged in the recesses 101 they are in their radial outermost positions and the outer jaw parts 2a are all locked with the respective inner jaw parts 2b. Rotation of the ring 100 in the direction 102 will cam the pins 13 inwardly with the inclined flanks 103 of the recesses 101 so that these pins 13 will ride on the cylindrical inner surface 105 of the ring 100. When thus cammed inwardly the pins 13 will move the respective surfaces 13.3 out of alignment with the surfaces 33 of the coupling members 18, allowing these members to move axially backwardly and decouple the respective outer jaw parts 2a. Radial holes 104 in the ring 100 allow a wrench to be applied to it. Thus the ring 100 will shield the ends of the pins 13, yet when rotated will simultaneously push all of these pins 13 inwardly to free all of the outer jaw parts 2b, so long, of course, as the jaws are in the outermost position so that the coupling members 8 can be displaced axially backwardly into the recesses 21 formed in the front face 19 of the body 1 on which the back face 20 of the jaw part 2b rides.

Figure 3:
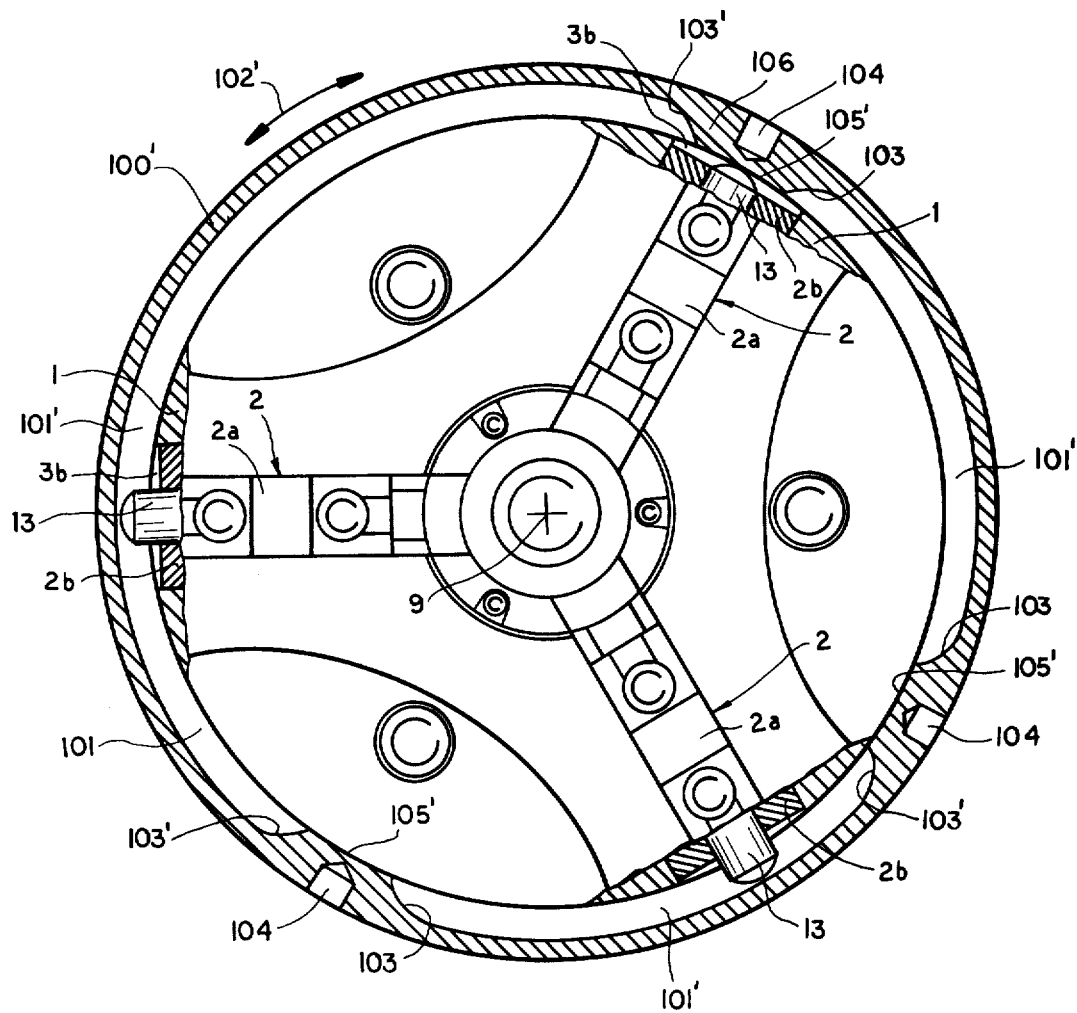
FIG. 3 is a section taken along line III—III of FIG. 1 through another chuck according to this invention.

The arrangement shown in FIG. 3 is in axial section indentical to that of FIG. 1. The main difference is that the arrangement of FIG. 3 has a ring 100' formed with three radially inwardly projecting bumps 106 having inner surfaces 105' and inclined side surfaces 103', and defining angularly elongated recesses 101'. Here, however, the bumps 106 are not angularly equispaced, but are spaced apart in such a manner that as the ring is rotated in the direction indicated by double-headed arrow 102' one of the bumps 106 will first depress one of the cams 13, here the cam 13 located approximately at two o'clock, then on further rotation this cam 13 will be pushed out into the respective recess 101' by the respective spring 14, whereupon the next bump 106 will press in the next cam 13, here the cam at five o'clock, and so on. Thus rotation of the ring 100 will sequentially displace the cams 13 into the positions allowing the respective coupling members 8 to move into the decoupling positions. In fact the angular spacing between each bump 106 and the bump 106 on one side is greater by at least the angular dimension of the bump 106 than the angular spacing between it and the bump on the other side. Thus the main difference between the embodiments of FIGS. 1 and 2 on one side and FIG. 3 on the other is that in the arrangement of FIGS. 1 and 2 angular displacement of the ring 100 will push in all of the cam 13 simultaneously, whereas in the arrangement of FIG. 3 such rotation will sequentially depress the cam 13. Of course as the ring 100 rotates it releases each depressed cam 13 before depressing the next one, so that any one time only one cam 13 can be depressed.

I claim:

1. A lathe chuck comprising:
    a chuck body rotatable about a chuck axis and formed with a plurality of angularly spaced and radially extending inner guides and with a plurality of angularly spaced and radially extending outer guides;
    respective inner and outer jaw parts radially displaceable in said chuck body in said inner and outer guides;
    means including at least one operating element engageable with said inner jaw parts for radially displacing same in said chuck body in the respective inner guides;
    respective coupling members axially displaceable in said inner jaw parts and each displaceable between a coupling position engaging the respective outer jaw part and coupling same to the respective inner jaw part for joint radial movement and a decoupling position for relative radial displacement of the respective jaw parts;
    respective cams radially displaceable in said inner jaw parts in engagement with the respective coupling members between radially outer positions holding the respective coupling members in said coupling positions and radially inner positions in which the respective coupling members can assume said decoupling positions;
    respective springs braced against said cams and urging same radially outwardly into said outer positions; and
    a release ring rotatable on said chuck about said axis and formed with at least one radially inwardly extending projection engageable with said cams to move same into said inner positions against the force of the respective springs.

2. The chuck defined in claim 1 wherein said ring has adjacent said projection at least one recess, and at least one inclined flank extending between said projection and said recess, said flank being engageable with said cams on rotation of said ring on said chuck body to cam said cams into said radially inner positions against the force of the respective springs.

3. The chuck defined in claim 2 wherein said projection is so positioned and dimensioned that only one of said cams can be depressed by it into said radially inner position at any one time.

4. The chuck defined in claim 3 wherein said pin has one such projection, flank, and recess for each cam, said projections, flanks, and recesses being angularly spaced at spacings different from the angular spacings between said cams so that only one of the projections can engage any of the cams at any one time.

5. The chuck defined in claim 4 wherein said cams are angularly equispaced, said projections being irregularly angularly spaced.

6. The chuck defined in claim 4 wherein said cams number three, one of said projections being spaced in one angular direction from one of the two flanking projections by an angular distance equal generally to 120° plus the angular dimension of any of said projections and in the opposite angular direction from the other of the two flanking projections by an angular distance equal generally to 120° minus the angular dimension of any of said projections.

7. The chuck defined in claim 1 wherein said ring is centered on said axis and completely covers the radial outer ends of said cams.

8. The chuck defined in claim 7 wherein said ring is formed with respective inwardly open recesses in which said cams engage in said outer positions.

9. The chuck defined in claim 1, further comprising:
    respective weights radially displaceable on said chuck body adjacent said inner jaw parts; and
    means including respective force-transmitting members engaged between said weights and the respective inner jaw parts for converting radially outwardly directed centrifugal forces of said weights into radially inwardly directed forces on the respective inner jaw parts.

10. The chuck defined in claim 1 wherein said body is formed with respective radially limited and axially forwardly open recesses in which said coupling members are axially backwardly engageable in said decoupling positions only in radial outermost positions of the respective inner jaw parts, said body having a blocking surface preventing displacement of said coupling members into said decoupling position except when the respective inner jaw parts are in the radial outermost position and similarly preventing radial displacement of said inner jaw parts inwardly from said radial outermost positions when the respective coupling members are engaged in the respective recesses.

* * * * *